(12) United States Patent
Ishii et al.

(10) Patent No.: US 9,790,911 B2
(45) Date of Patent: *Oct. 17, 2017

(54) ENGINE CONTROL DEVICE

(71) Applicant: Toyota Jidosha Kabushiki Kaisha, Toyota-shi Aichi-ken (JP)

(72) Inventors: Kenichi Ishii, Miyoshi (JP); Hiroto Miura, Toyota (JP); Hideki Ohashi, Chiryu (JP); Yosuke Yamashita, Nagoya (JP); Masataka Okuda, Toyota (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 281 days.

This patent is subject to a terminal disclaimer.

(21) Appl. No.: 14/735,645

(22) Filed: Jun. 10, 2015

(65) Prior Publication Data
US 2015/0361940 A1  Dec. 17, 2015

(30) Foreign Application Priority Data

Jun. 11, 2014 (JP) ................................ 2014-120967

(51) Int. Cl.
*F02N 11/08* (2006.01)
*B60G 17/0195* (2006.01)
(Continued)

(52) U.S. Cl.
CPC ........ *F02N 11/084* (2013.01); *B60G 17/0195* (2013.01); *B60W 10/06* (2013.01);
(Continued)

(58) Field of Classification Search
CPC ............... F02N 11/084; F02N 2200/08; B60G 17/0195; B60G 2400/30; B60G 2400/33;
(Continued)

(56) References Cited

U.S. PATENT DOCUMENTS 2,965,389 A * 12/1960 Dietrich ............... B60G 17/052
  267/64.16
4,714,272 A * 12/1987 Buma ................ B60G 17/0165
  280/5.516
(Continued)

FOREIGN PATENT DOCUMENTS

JP   U59-117511 A   8/1984
JP   09-323524 A    12/1997
(Continued)

*Primary Examiner* — Stephen K Cronin
*Assistant Examiner* — Susan Scharpf
(74) *Attorney, Agent, or Firm* — Dinsmore & Shohl LLP

(57) ABSTRACT

An engine control device applied to a vehicle equipped with an actuator for changing a suspension property of the vehicle, a suspension control device for driving the actuator, and an engine. The engine control device automatically stops the engine operation when a stop condition is satisfied and automatically starts the engine operation when a start condition is satisfied, continues the engine operation when a signal for inhibiting the automatic stop of the engine operation is sent to the engine control device in order to drive the actuator and the engine control device judges that no malfunction occurs in the suspension control device even if the stop condition is satisfied, and ignores the signal and automatically stops the engine operation when the stop condition is satisfied and judges that the malfunction occurs in the suspension control device even if the signal is sent to the engine control device.

6 Claims, 8 Drawing Sheets

(51) Int. Cl.
  *B60W 10/06* (2006.01)
  *B60W 10/22* (2006.01)
(52) U.S. Cl.
  CPC .......... *B60W 10/22* (2013.01); *B60G 2400/30* (2013.01); *B60G 2400/33* (2013.01); *F02N 2200/08* (2013.01); *Y02T 10/48* (2013.01)
(58) Field of Classification Search
  CPC ............ B60G 17/0161; B60G 17/0165; B60G 17/0525; B60G 17/06565; B60G 2500/30; B60W 10/06; B60W 10/22; Y02T 10/48; A61G 3/065; A61G 3/066
  USPC ........... 701/112; 123/179.3, 179.4; 280/6.15, 280/6.151, 6.152, 6.153, 6.155, 6.157, 280/6.158
  See application file for complete search history.

(56) References Cited

U.S. PATENT DOCUMENTS

| | | | | |
|---|---|---|---|---|
| 4,729,580 A | * | 3/1988 | Buma | B60G 17/0165 280/5.513 |
| 4,744,589 A | * | 5/1988 | Buma | B60G 17/0165 280/5.514 |
| 8,706,366 B2 | * | 4/2014 | Kim | F02N 11/0814 123/179.4 |
| 9,205,717 B2 | * | 12/2015 | Brady | B60G 17/06 |
| 9,598,079 B2 | * | 3/2017 | Ishii | B60W 30/18 |
| 2009/0088918 A1 | * | 4/2009 | Takenaka | B60T 8/17551 701/31.4 |
| 2010/0145562 A1 | * | 6/2010 | Moran | B60K 6/46 701/22 |
| 2011/0004396 A1 | | 1/2011 | Yamaguchi | |
| 2011/0112740 A1 | * | 5/2011 | Hashimoto | F02D 17/02 701/70 |
| 2015/0046070 A1 | * | 2/2015 | Awadi | F02D 17/04 701/112 |

FOREIGN PATENT DOCUMENTS

| | | |
|---|---|---|
| JP | 2006-329122 A | 12/2006 |
| JP | 4356142 B2 | 11/2009 |
| JP | 2010-064582 A | 3/2010 |
| JP | 2011-012594 A | 1/2011 |
| JP | 2013-036343 A | 2/2013 |

* cited by examiner

ENGINE CONTROL DEVICE

BACKGROUND ART

Field of the Invention

The invention relates to an engine control device applied to a vehicle comprising a suspension control device and an internal combustion engine and capable to automatically stop an operation of the engine and automatically start the operation of the engine (restart the operation of the engine).

Description of Related Art

Conventionally, a suspension control device is known. The suspension control device electrically controls a suspension property of a vehicle such as a vehicle height, a spring constant of a suspension and a damping force of a shock absorber. The suspension control device includes an actuator. The actuator is, for example, a motor for driving a compressor for supplying an air to an air suspension for adjusting the vehicle height. An electricity consumption of such a motor is large and thus, a battery voltage (a power source voltage) of the vehicle excessively lowers when the motor is driven, and as a result, a problem may occur in another electric devices.

Accordingly, one of the conventional techniques carries out an idle-up of the engine when the operation of the engine is under the idling state in order to drive the actuator (for example, the motor) of the suspension control device which consumes a large amount of the power (for example, refer to JP 59-117511 U). Thereby, when the actuator of the suspension control device is driven under the idling state of the engine, the amount of the power generated by an alternator (an electric generator) driven by the engine increases. As a result, the voltage of the battery of the vehicle does not excessively lower and the actuator can be assuredly driven.

On the other hand, in recent years, a device for improving the fuel consumption of the engine by automatically stopping the operation of the engine when a predetermined engine operation stop condition is satisfied (that is, the automatic stop and start control device of the engine) has been employed (for example, refer to JP 2006-329122 A and JP 2013-36343 A). Hereinafter, the automatic stop and start control device of the engine may be simply referred to as "the engine control device".

SUMMARY OF THE INVENTION

As described above, when the actuator of the suspension control device is driven, the battery voltage lowers and thus, it is desired that the operation of the engine continues so as to make the alternator generate the power even when the engine operation stop condition is satisfied. Accordingly, the inventors of this application has realized that it is preferred to send a signal for requesting to inhibit the automatic stop of the operation of the engine to the engine control device when the suspension control device drives the actuator and the engine control device continues the operation of the engine when the engine control device receives the signal. Hereinafter, the signal for requesting to inhibit the automatic stop of the engine operation may be referred to as "the engine operation stop inhibition requesting signal" or "the stop inhibition requesting signal".

However, when the suspension control device continues to generate the stop inhibition requesting signal due to any reason (for example, due to a malfunction occurring in the CPU), the engine control device cannot stop the operation of the engine even when the engine operation stop condition is satisfied and thus, the problem such as the increasing of the fuel consumption of the engine occurs.

The invention is made for solving the problem described above. That is, one of the objects of the invention is to provide an engine control device which can stop the operation of the engine when the engine operation stop condition is satisfied even if the suspension control device continues to generate the stop inhibition requesting signal due to the malfunction of the suspension control device.

The engine control device according to the invention for accomplishing the object described above is applied to a vehicle equipped with:

an electric actuator for changing a suspension property of the vehicle;

a suspension control device for driving the actuator; and an internal combustion engine.

Hereinafter, the engine control device according to the invention may be referred to as "the invention device"

Further, the invention device comprises an engine control part programmed to:

automatically stop the operation of the engine when a predetermined engine operation stop condition is satisfied; and automatically start the operation of the engine when a predetermined engine operation start condition is satisfied.

In addition, the engine control part is programmed to judge if a malfunction occurs in the suspension control device.

The engine control part is programmed to continue the operation of the engine (that is, not to carry out the automatic stop of the operation of the engine) when a stop inhibition requesting signal for inhibiting the automatic stop of the operation of the engine is sent to the engine control device in order to drive the actuator and the engine control part judges that no malfunction occurs in the suspension control device even if the engine operation stop condition is satisfied.

On the other hand, the engine control part is programmed to ignore (mask) the stop inhibition requesting signal and automatically stop the operation of the engine when the engine operation stop condition is satisfied and the engine control part judges that the malfunction occurs in the suspension control device even if the stop inhibition requesting signal is sent to the engine control device.

Basically, the invention device continues to operate the engine when the suspension control device sends the stop inhibition requesting signal to the invention device and thus, the power source voltage does not excessively lower even when the actuator described above is driven. Thereby, no trouble occurs in the other system of the vehicle. However, when the malfunction occurs in the suspension control device and thus, the suspension control device continues to send the stop inhibition requesting signal to the invention device, the invention device ignores (masks) the stop inhibition requesting signal and thus, the invention device can automatically stop the operation of the engine. As a result, the situation where the vehicle continues to run with an increased consumption of the fuel of the engine can be avoided and thus, the increasing of the consumption of the fuel can be prevented.

In this case, preferably, the engine control part may be programmed to judge if a malfunction occurs in the suspension control device by using the stop inhibition requesting signal.

Thereby, the invention device can judge that the malfunction occurs in the suspension control device without carrying out an exchange of a specific signal other than the stop inhibition requesting signal between the suspension control device and the invention device (the engine control device).

Further, the suspension control device does not need to always drive the actuator. That is, the suspension control device may be configured to drive the actuator during a particular time period (that is, during a time period when the driving of the actuator is allowed or during a part of the time period) and send the stop inhibition requesting signal to the engine control device while the suspension control device drives the actuator. In this case, if the suspension control device is under the normal state, the suspension control device does not send the stop inhibition requesting signal to the engine control device during a time period other than the particular time period.

Accordingly, the engine control part may be programmed to judge that the malfunction occurs in the suspension control device when the suspension control device sends the stop inhibition requesting signal to the engine control part during a time period other than the particular time period. Thereby, the engine control part can easily judge if a malfunction occurs in the suspension control device.

In particular, the actuator may include a motor for driving a compressor for supplying an air to an air suspension for adjusting the height of the vehicle.

In this case, the suspension control device may be configured to:

start driving the motor at a first timing when a condition for driving the motor is satisfied;

send the stop inhibition requesting signal to the present device (the engine control device) during the driving the motor; and stop driving the motor at a second timing when a time period of driving the motor reaches a predetermined constant time period or at a timing before the second timing.

In other words, the motor and the compressor may be configured to complete the vehicle height adjustment before the time period of driving the motor to drive the compressor reaches the predetermined constant time period.

If the suspension control device is configured as described above, the engine control part may be configured to judge that the malfunction occurs in the suspension control device when the suspension control device has continued to send the stop inhibit requesting signal to the engine control device (the invention device) for a malfunction judgment threshold time period longer than or equal to the predetermined constant time period.

Thereby, when the suspension control device is under the normal state, the suspension control device has not continued to send the stop inhibition requesting signal to the engine control device for the malfunction judgment threshold time period. Thus, the engine control device can easily and assuredly judge if a malfunction occurs in the suspension control device.

The engine control part of the invention device may be programmed to continue to ignore (mask) the stop inhibition requesting signal until a state of an ignition switch of the vehicle is changed from an ON state to an OFF state after the engine control part judges that the malfunction occurs in the suspension control device.

Thereby, when the ignition switch is under the ON state and it is judged that the malfunction occurs in the suspension control device, the stop inhibition requesting signal is continued to be ignored until the state of the ignition switch is changed to the OFF state. Thus, the occasion of automatically stopping the operation of the engine increases. That is, once it is judged that the malfunction occurs in the suspension control device when the ignition switch is under the ON state, the suspension control device is not repaired or replaced at least until the driving of the vehicle is terminated. Thereby, it can be expected that the suspension control device is continued to be under the malfunction state until the state of the ignition switch is changed to the OFF state. Therefore, according to the invention device having the configuration described above, the occasions of automatically stopping the operation of the engine can be effectively utilized independently of the error stop inhibition requesting signal. Alternatively, according to the present device having the configuration described above, the automatic stop of the operation of the engine can be carried out without judging if the malfunction judgment threshold time period elapses in order to judge if a malfunction occurs in the suspension control device every the stop inhibition requesting signal is sent. Thus, the shortening of the time period when the operation of the engine is stopped can be prevented. Thereby, the increasing of the fuel consumption can be prevented.

In this case, the engine control part may be programmed to stop ignoring the stop inhibition requesting signal when the state of the ignition switch of the vehicle is changed from the ON state to the OFF state and then, to the ON state again after the engine control part judges that the malfunction occurs in the suspension control device.

After the state of the ignition switch is changed to the OFF state, the suspension control device may be repaired or replaced until the state of the ignition switch is changed to the ON state next time. Therefore, when the state of the ignition switch is again changed to the ON state, it is desired that it is judged if a malfunction occurs in the suspension control device again. Thereby, the user can efficiently use the function of the suspension control device.

The other objects, the other features and the accompanying advantages of the invention can be easily understood from the description of the embodiments of the invention with reference to the drawings.

DESCRIPTION OF THE EMBODIMENTS

<Configuration>

Figure 1:
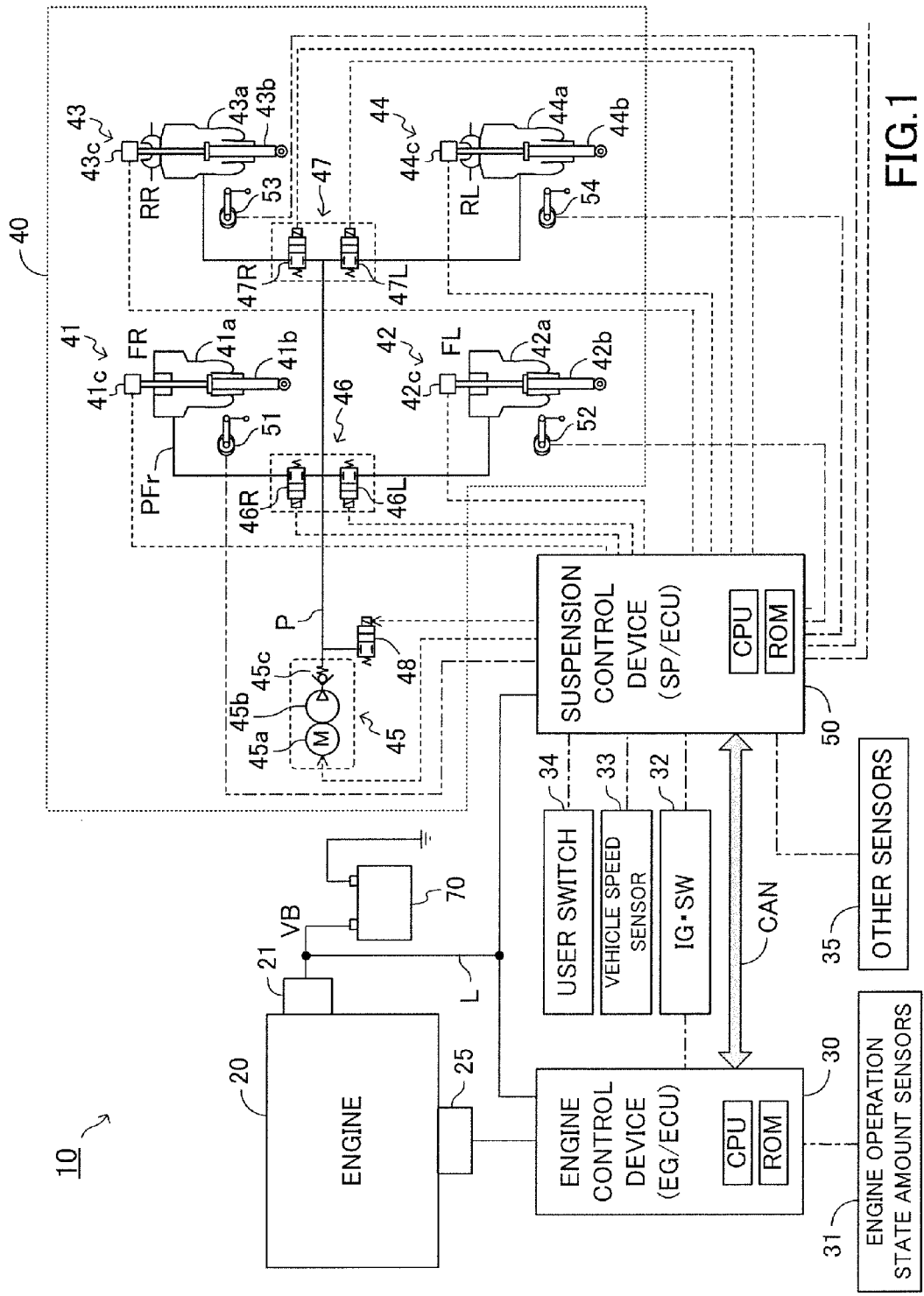
FIG. 1 is a schematic configuration diagram of a vehicle equipped with an engine control device according to the embodiment of the invention.

FIG. 1 shows a general configuration of a vehicle 10 equipped with an engine control device according to an embodiment of the invention. The vehicle 10 is equipped with an internal combustion engine 20, engine actuators 25, an engine control device 30, a suspension device 40, a suspension control device 50, etc.

The engine 20 is a four-cycle spark-ignition multi-cylinder gasoline-fuel internal combustion engine. The engine 20 is configured to generate a torque for driving drive wheels (not shown) of the vehicle 10. Further, the engine 20 is configured to drive an alternator (an electric generator) 21 during the engine operation and generate an electric power by the alternator 21. The engine actuators 25 include well-known actuators for carrying out operations necessary to operate the engine 20. For example, the engine actuators 25 include fuel injectors, ignition devices and a throttle actuator for changing an opening degree of a throttle valve.

The engine control device 30 includes an electronic control circuit having the well-known micro computer including the CPU, the ROM, the RAM, the backup RAM, the interface provided with the AD converter, etc. The ROM stores programs (instructions) executed by the CPU. Hereinafter, the engine control device 30 will be referred to as "the engine ECU" and may be written by "the EG/ECU". The ECU means the Electronic Control Unit. Further, the engine control device 30 may be referred to as "the automatic stop/start control device of the engine (S&S/ECU: Start and Stop ECU)".

The engine control device 30 is configured to acquire various input values from a plurality of engine operation state amount sensors 31. The engine operation state amount sensors 31 include sensors and a switch described below.

An engine speed sensor for detecting the engine speed NE.

A throttle valve opening degree sensor for detecting an opening degree TA of the throttle valve not shown.

An acceleration pedal manipulation amount sensor for detecting a manipulation amount AP of the acceleration pedal not shown.

An air flow meter for detecting an intake air amount Ga of the engine.

A break switch (a stop lamp switch) for detecting a depression of the break pedal not shown.

Further, the engine control device 30 is configured to receive a signal from the ignition switch 32 of the engine 10 and acquire a state (ON and OFF states) of the ignition switch 32.

The engine control device 30 is connected to the suspension control device 50 via an onboard network (CAN) so as to enable an information exchange (a communication) with the suspension control device 50. Further, the engine control device 30 is connected to the engine actuators 25 and is configured to send driving signals to the engine actuators 25, respectively. That is, the engine control device 30 is configured to send ignition command signals to the ignition plugs (actually, the igniters) of the cylinders, respectively, send injection command signals to the fuel injectors of the cylinders, respectively, and send an opening degree command signal to the throttle actuator.

The suspension device 40 is the well-known air suspension device having a damping force variable function and includes devices, parts, etc. described below.

A right front side suspension device 41.
A left front side suspension device 42.
A right rear side suspension device 43.
A left rear side suspension device 44.
A compressor/motor device 45.
A front vehicle height adjustment valve device 46.
A rear vehicle height adjustment valve device 47.
An exhaust valve 48.

The right front side suspension device 41 has a chamber 41a including a diaphragm, a shock absorber 41b and an absorber control actuator 41c. Hereinafter, the absorber control actuator 41c may be written by "the ACA".

When a compressed air is supplied to the chamber 41a via an air delivery pipes P and PFr, the distance between the right front wheel and the vehicle body is increased and thus, the vehicle height of the vehicle body part at the right front wheel area is raised. When the air is discharged from the chamber 41a, the distance between the right front wheel and the corresponding vehicle body is decreased and thus, the vehicle height of the vehicle body part at the right front wheel area is lowered.

The shock absorber 41b includes a rotory valve (not shown) for changing the damping force with multistep (in this embodiment, sixteen steps). Hereinafter, the rotary valve may be referred to as "the damping force control valve".

The ACA 41c is a step motor and rotates the rotary valve to change the damping force generated by the shock absorber 41b.

The left front side, right rear side and left rear side suspension devices 42, 43 and 44 have the same configuration as the configuration of the right front side suspension device 41, respectively and thus, the descriptions thereof will be omitted. It should be noted that the elements 42a, 43a and 44a are chambers corresponding to the chamber 41a, respectively. Further, the elements 42b, 43b and 44b are shock absorbers corresponding to the shock absorber 41b, respectively. Furthermore, the elements 42c, 43c and 44c are ACAs corresponding to the ACA 41c, respectively.

The compressor/motor device 45 includes a motor (an electric motor) 45a, a compressor 45b and a check valve 45c.

The motor 45a is one of the electrically driven actuators for changing a suspension property (the vehicle height) of the vehicle body according to the invention. The motor 45a drives the compressor 45b. The motor 45a is controlled by the suspension control device 50.

When the compressor 45b is driven, the compressor 45b compresses the air and supplies the compressed air to the air delivery pipe P.

The check valve 45c allows the air to flow from the compressor 45b to the air delivery pipe P and prevents the air from flowing from the air delivery pipe P to the compressor 45b.

The front vehicle height adjustment valve device 46 has a right front side and left front side control valves 46R and 46L.

The right front side control valve 46R is a two position electromagnetic valve which can be positioned selectively at one of communication and shut-off positions.

When the right front side control valve 46R is positioned at the communication position, the air delivery pipe P and the air delivery pipe PFr communicate with each other. Therefore, the air delivery pipe P and the chamber 41a communicate with each other.

On the other hand, when the right front side control valve 46R is positioned at the shut-off position, the communication of the air delivery pipes P and PFr with each other is shut off. Therefore, the communication of the delivery pipe P and the chamber 41a with each other is shut off.

The left front side control valve 46L has the same configuration and function as the configuration and the function of the right front side control valve 46R.

Therefore, when the left front side control valve 46L is positioned at the communication position, the air delivery pipe P and the chamber 42a communicate with each other.

On the other hand, when the left front side control valve 46L is positioned at the shut-off position, the communication of the air delivery pipe P and the chamber 42a with each other is shut off.

The rear vehicle height adjustment device 47 has a right rear side and left rear side control valves 47R and 47L.

The right rear side control valve 47R has the same configuration and function as the configuration and function of the right front side control valve 46R.

Therefore, when the right rear side control valve 47R is positioned at the communication position, the air delivery pipe P and the chamber 43a communicate with each other.

On the other hand, when the right rear side control valve 47R is positioned at the shut-off position, the communication of the air delivery pipe P and the chamber 43a with each other is shut off.

The left rear side control valve 47L has the same configuration and function as the configuration and function of the right front side control valve 46R.

Therefore, when the left rear side control valve 47L is positioned at the communication position, the air delivery pipe P and the chamber 44a communicate with each other.

On the other hand, when the rear left control valve 47L is positioned at the shut-off position, the communication of the air delivery pipe P and the chamber 44a with each other is shut off.

The exhaust valve 48 is a two position electromagnetic valve which can be positioned selectively at one of communication and shut-off positions.

When the exhaust valve 48 is positioned at the communication position, the air delivery pipe P opens to the outside air.

On the other hand, when the exhaust valve 48 is positioned at the shut-off position, the air delivery pipe P does not open to the outside air.

The suspension control device 50 includes an electronic control circuit including the micro computer similar to the micro computer of the engine control device 30. Hereinafter, the suspension control device 50 may be referred to as "the vehicle height adjustment control device" or "the suspension ECU" or "the absorber control unit" and may be written by "the SP/ECU".

The suspension control device 50 is configured to receive signals from the ignition switch 32, the vehicle speed sensor 33 for detecting the vehicle speed SPD and an user switch 34 (a change-over switch) 34.

The user switch 34 is a switch manipulated by an user when the user selects the vehicle height and/or the damping force which the user desires. The user can select and instruct any of the vehicle height raising and lowering by manipulating the user switch 34. Further, the user can select and instruct the damping forces of the shock absorbers 41b to 44b corresponding to the wheels, respectively at any of the hard, normal and soft modes by manipulating the user switch 34.

Furthermore, the suspension control device 50 is configured to acquire input values from a plurality of sensors for detecting suspension state amounts described below, respectively.

A vehicle height sensor 51 for detecting the vehicle height and the vertical direction acceleration of the right front wheel area vehicle body part (at the front right side).

A vehicle height sensor 52 for detecting the vehicle height and the vertical direction acceleration of the left front wheel area vehicle body part (at the front left side).

A vehicle height sensor 53 for detecting the vehicle height and the vertical direction acceleration of the right rear wheel area vehicle body part (at the rear right side).

A vehicle height sensor 54 for detecting the vehicle height and the vertical direction acceleration of the left rear wheel area vehicle body part (at the rear left side).

That is, each of the vehicle height sensors 51 to 54 incorporates a G sensor for detecting the acceleration in the vertical direction of a predetermined part of the vehicle body.

In addition, the suspension control device 50 is connected to the other sensors 35 and is configured to acquire various input values from the sensors 35. The sensors 35 include a yaw rate sensor, a steering angle sensor, etc.

The suspension control device 50 is connected to the electric actuators of the suspension device 40 (that is, the ACAs 41c to 44c, the compressor driving motor 45a, the control valves 46R, 46L, 47R and 47L, the exhaust valve 48, etc.). The suspension control device 50 is configured to send the driving signals to the actuators, respectively to drive (control) the actuators.

For example, the suspension control device 50 drives the motor 45a and moves the right front side control valve 46R to the communication position while moving the exhaust valve 48 to the shut-off position to raise the vehicle height of the right front wheel area vehicle body part. Thereby, the air compressed by the compressor 45b is supplied to the chamber 41a through the air delivery pipe P, the right front side control valve 46R and the air delivery pipe PFr. As a result, the vehicle height of the right front wheel area vehicle body part is raised. Then, the suspension control device 50 moves the right front side control valve 46R to the shut-off position. As a result, the vehicle height of the right front wheel area vehicle body part is maintained.

On the other hand, the suspension control device 50 stops the operation of the motor 45a and moves the right front side control valve 46R to the communication position while moving the exhaust valve 48 to the communication position to lower the vehicle height of the right front wheel area vehicle body part. Thereby, the air in the chamber 41a is discharged to the outside air through the air delivery pipe PFr, the right front side control valve 46R, the air delivery pipe P and the exhaust valve 48. As a result, the vehicle height of the right front wheel area vehicle body part is lowered. Then, the suspension control device 50 moves the right front side control valve 46R to the shut-off position. As a result, the vehicle height of the right-front wheel vehicle body is maintained.

Similarly, the motor 45a, the left front side control valve 46L and the exhaust valve 48 are used to adjust the vehicle height of the left front wheel area vehicle body part. The motor 45a, the right rear side control valve 47R and the exhaust valve 48 are used to adjust the vehicle height of the right rear wheel area vehicle body part. The motor 45a, the left rear side control valve 47L and the exhaust valve 48 are used to adjust the vehicle height of the left rear wheel area vehicle body part. The method for controlling the adjustment of the vehicle height of each of the vehicle body parts is similar to the method for controlling the adjustment of the vehicle height of the right front wheel area vehicle body part described above and thus, the descriptions thereof will be omitted.

Further, the suspension control device 50 calculates an optimal damping force at each of the wheels on the basis of the received various sensor signals, etc. Then, the suspension control device 50 changes the step position of each of the absorber control actuators (the ACAs) 41c to 44c such that the damping force of each of the shock absorbers 41b to 44b of the wheels corresponds to the calculated optimal damping force.

Further, the vehicle 10 incorporates a battery 70 for accessories of the vehicle 10. The battery 70 is electrically connected to the alternator 21 (and actually, a voltage regulator not shown) and is configured to be charged by the power generated by the alternator 21. The battery 70 is connected to the engine control device 30 and the suspension control device 50 by power lines L, respectively and functions as a power source for the devices 30 and 50 (supplies the power to the devices 30 and 50). Further, the battery 70 functions as the power source for supplying the power to the engine actuators 25 and the actuators described above of the suspension device 40 to drive the engine actuators 25 and the actuators of the suspension device 40.

<Summary of Actuation of Engine Control Device>

Next, the summary of the actuation of the engine control device (the EG/ECU) 30 configured as described above will be described. The CPU of the engine control device 30 is programmed to execute a routine shown in FIG. 2 by a summarized flow chart every a predetermined time period elapses. Hereinafter, the CPU of the engine control device 30 will be written by "the EG/CPU".

Figure 2:
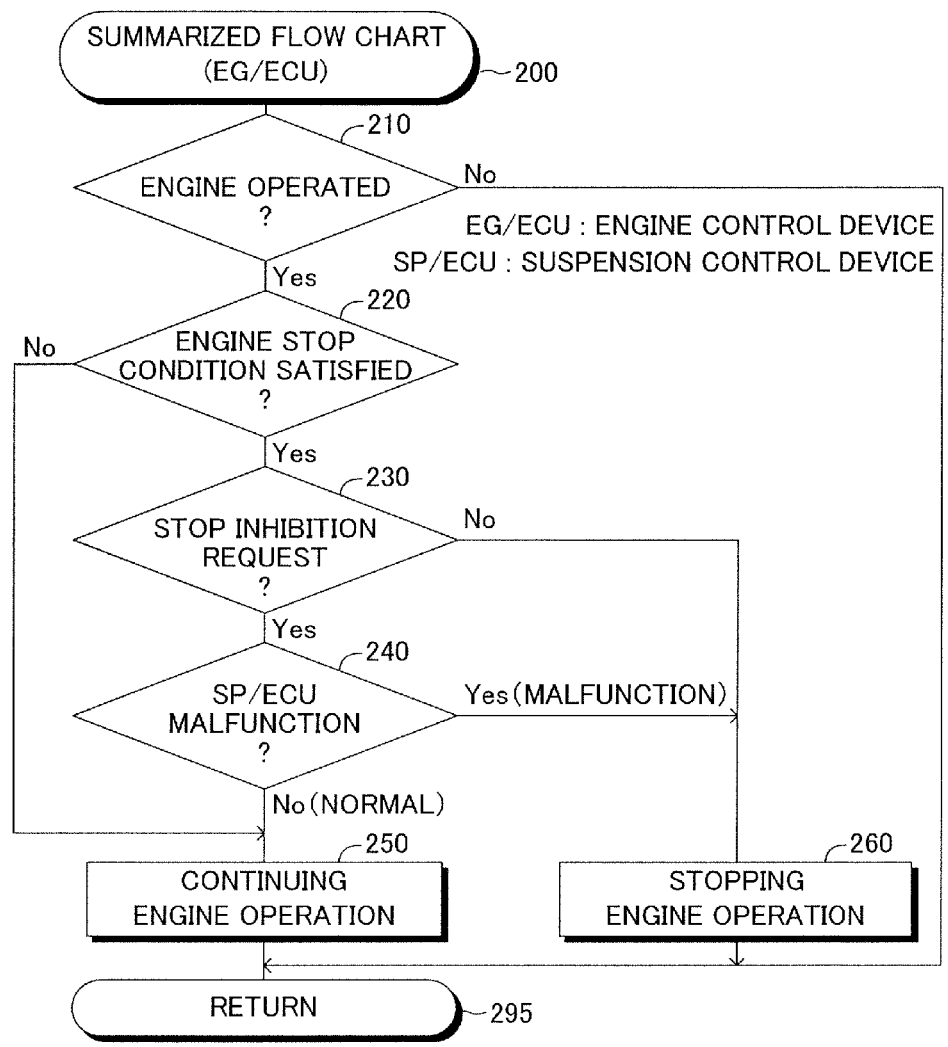
FIG. 2 is a flow chart showing a summary of the processes executed by a CPU of the engine control device shown in FIG. 1.

Therefore, the EG/CPU starts the processes from the step 200 of FIG. 2 at a predetermined timing and then, proceeds to the step 210 where the EG/CPU judges if the engine 20 is being operated. When the engine 20 is not operated at the process of the step 210 being executed, the EG/CPU judges "No" at the step 210 and then, proceeds directly to the step 295 where the EG/CPU terminates the routine.

On the other hand, when the engine 20 is being operated at the process of the step 210 being executed, the EG/CPU judges "Yes" at the step 210 and then, proceeds to the step 220 where the EG/CPU judges if the engine operation stop condition (the condition for temporarily stopping the operation of the engine 20) is satisfied. For example, the engine operation stop condition is satisfied when all conditions described below are satisfied.

(Condition 1) The vehicle speed SPD is smaller than or equal to a threshold vehicle speed for the engine operation stop SPDth. The threshold vehicle speed for the engine operation stop SPDth is a predetermined low vehicle speed and in this embodiment, is zero (km/h).

(Condition 2) The brake switch is under the ON state. That is, the brake pedal is depressed and the vehicle 10 is being braked.

(Condition 3) The acceleration pedal manipulation amount AP is zero. That is, the acceleration pedal is not depressed and thus, no acceleration is requested.

However, the engine operation stop condition is not limited to the conditions described above. For example, the condition that the battery voltage VB is higher than or equal to a predetermined threshold voltage VBth and/or the condition that the cooling water temperature THW is higher than or equal to a predetermined threshold cooling water temperature THWth, etc. may be added to the conditions 1 to 3 described above.

When the engine operation stop condition is not satisfied at the process of the step 220 being executed, the EG/CPU judges "No" at the step 220 and then, proceeds directly to the step 250 where the EG/CPU continues to operate the engine 20. Then, the EG/CPU proceeds to the step 295 where the EG/CPU terminates the routine.

On the other hand, when the engine operation stop condition is satisfied at the process of the step 220 being executed, the EG/CPU judges "Yes" at the step 220 and then, proceeds to the step 230 where the EG/CPU judges if the suspension control device (the SP/ECU) 50 sends a signal for requesting to inhibit the stop of the engine operation (the stop inhibition requesting signal) to the EG/ECU 30.

The SP/ECU 50 is configured to send the signal for requesting to inhibit the stop of the engine operation (that is, the stop inhibition requesting signal) to the EG/ECU 30 to prevent the battery voltage VB from lowering excessively when the SP/ECU 50 drives the predetermined actuators of the suspension device 40. The predetermined actuators are electric actuators for changing the suspension property, respectively, each of which consumes a large amount of the power or needs a large value of the electric source voltage for ensuring the operation of the actuator. That is, for example, the predetermined actuators include the motor 45a for driving the compressor 45b and/or the absober control actuators (the ACAs) 41c to 44c which are step motors, respectively.

Further, the SP/ECU 50 is configured not to continue to drive the motor 45a beyond a constant threshold driving time period Tth when the SP/ECU 50 carries out the adjustment of the vehicle height. This is because the adjustment of the vehicle height can be deemed to be completed when the motor 45a has continued to be driven for the threshold driving time period Tth. Therefore, when the SP/ECU 50 is under the normal state, the SP/ECU 50 is configured not to continue to send the stop inhibition requesting signal to the EG/ECU 30 beyond the threshold driving time period Tth when the SP/ECU carries out the adjustment of the vehicle height.

When the SP/ECU 50 does not send the stop inhibition requesting signal to the EG/ECU 30 at the process of the step 230 being executed, the EG/CPU judges "No" at the step 230 and then, proceeds to the step 260 where the EG/CPU stops (automatically stops) the operation of the engine 20, for example, by stopping the fuel injections. Then, the EG/CPU proceeds to the step 295 where the EG/CPU terminates the routine.

On the other hand, when the SP/ECU 50 sends the stop inhibition requesting signal to the EG/ECU 30 at the process of the step 230 being executed, the EG/CPU judges "Yes" at the step 230 and then, proceeds to the step 240 where the EG/CPU judges if a malfunction occurs in the SP/ECU 50.

As described above, when the SP/ECU 50 is under the normal state, the SP/ECU 50 is configured not to continue to send the stop inhibition requesting signal to the EG/ECU 30 beyond the threshold driving time period Tth. Accordingly, the EG/CPU judges if a malfunction occurs in the SP/ECU 50 by judging if the SP/ECU 50 has continued to send the stop inhibition requesting signal to the EG/ECU 30 beyond a predetermined time period Tth+α (α is larger than or equal to zero). However, the method for judging if a malfunction occurs in the SP/ECU 50 at the step 240 is not limited to the method described above. Hereinafter, the predetermined time period Tth+α may be referred to as "the malfunction judgment threshold time period Tijoth".

When the time period for the SP/ECU 50 continuing to send the stop inhibition requesting signal to the EG/ECU 30, is shorter than the malfunction judgment threshold time period Tijoth and thus, the EG/CPU judges that no malfunction occurs in the SP/ECU 50 at the step 240, the EG/CPU proceeds to the step 250. That is, when the EG/CPU judges that no malfunction occurs in the SP/ECU 50 (in other words, the EG/CPU judges that the SP/ECU 50 is under the normal state), the EG/CPU proceeds to the step 250 where the EG/CPU continues to operate the engine 20 and then, proceeds to the step 295. As a result, even when the engine operation stop condition is satisfied, the operation of the engine 20 is not stopped.

On the other hand, when the SP/ECU 50 has continued to send the stop inhibition requesting signal to the EG/ECU 30 beyond the malfunction judgment threshold time period Tijoth (=Tth+α) and thus, the EG/CPU judges that a malfunction occurs in the SP/ECU 50 at the step 240, the EG/CPU proceeds to the step 260 where the EG/CPU stops the operation of the engine 20. That is, even when the SP/ECU 50 generates the stop inhibition requesting signal, the EG/ECU 30 deems that the stop inhibition requesting signal is generated (sent) due to the malfunction of the SP/ECU 50 and then, the EG/ECU 30 stops the operation of the engine 20 while ignoring (masking) the stop inhibition requesting signal. Then, the EG/CPU proceeds to the step 295 where the EG/CPU terminates the routine. The summary of the actuation of the engine control device 30 relating to the invention was described.

<Actual Actuation>

Next, the concrete actuations of the engine control unit (the EG/ECU) 30 and the suspension control device (the SP/ECU) 50 will be described.

1. Actuation of SP/ECU (1) Adjustment of Vehicle Height

Figure 3:
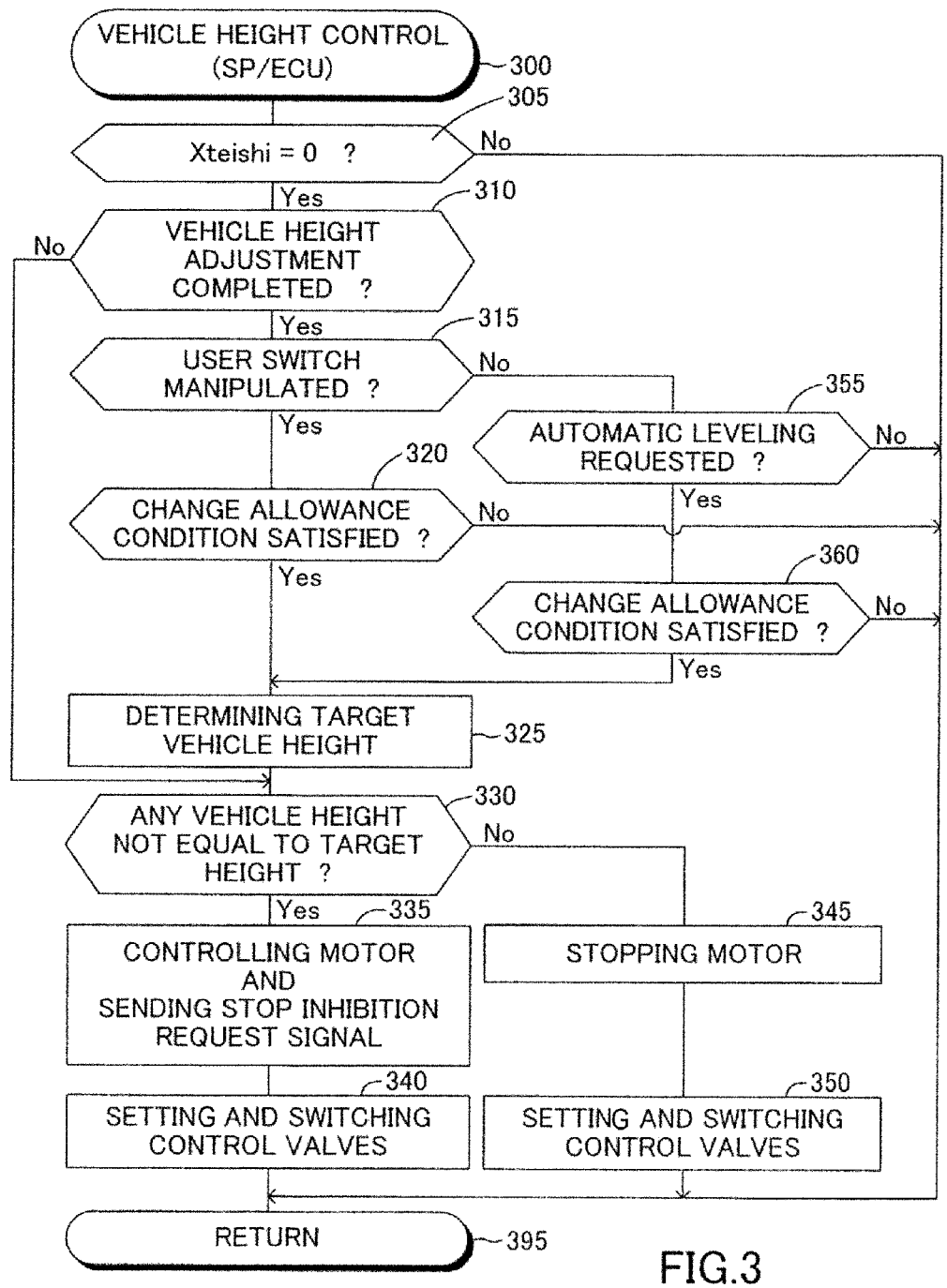
FIG. 3 is a flow chart showing a vehicle height control routine executed by a CPU of a suspension control device shown in FIG. 1.

The CPU of the SP/ECU 50 is programmed to execute a vehicle height control routine shown in FIG. 3 by a flow chart every a predetermined time period elapses. Hereinafter, the CPU of the SP/ECU 50 will be written by "the SP/CPU". Therefore, the SP/CPU starts the processes from the step 300 of FIG. 3 at a predetermined timing and then, proceeds to the step 305 where the SP/CPU judges if a value of a vehicle height adjustment stop flag Xteishi is "0".

The value "0" is set to the value of the flag Xteishi in an initial routine executed when the state of the ignition switch 32 is changed from the ON state to the OFF state. Further, the value "1" is set to the value of the flag Xteishi in a motor driving limiting routine shown in FIG. 4 described below. When the value of the flag Xteishi is "1" at the process of the step 305 being executed, the SP/CPU judges "No" at the step 305 and then, proceeds directly to the step 395 where the SP/CPU terminates the routine.

On the other hand, when the value of the flag Xteishi is "0" at the process of the step 305 being executed, the SP/CPU judges that "Yes" at the step 305 and then, proceeds to the step 310 where the SP/CPU judges if the vehicle height adjustment is completed.

Now, it is assumed that the vehicle height adjustment is completed. In this case, the SP/CPU judges "Yes" at the step 310 and then, proceeds to the step 315 where the SP/CPU judges if the vehicle height adjustment is requested by the user manipulating the user switch 34.

When the vehicle height adjustment is requested by the user, the SP/CPU judges "Yes" at the step 315 and then, proceeds to the step 320 where the SP/CPU judges if a condition for allowing to change a target vehicle height (a target vehicle height change allowance condition, that is, a vehicle height adjustment execution condition) is satisfied. For example, this condition includes facts that the engine 20 is being operated, the vehicle speed SPD does not decrease below a low vehicle speed SPDLth (for example, 60 km/h) after the vehicle speed SPD exceeds a high vehicle speed SPDHth (for example, 80 km/h), the battery voltage VB is larger than or equal to the predetermined threshold voltage VBth, etc.

When the target vehicle height change allowance condition is satisfied at the process of the step 320 being executed, the SP/CPU judges "Yes" at the step 320 and then, proceeds to the step 325 where the SP/CPU determines a target value of the vehicle height of each of the vehicle body parts at the wheels (that is, a target value of each of the vehicle heights of the right front wheel area vehicle body part, the left front wheel area vehicle body part, the right rear wheel area vehicle body part and the left front wheel area vehicle body part and hereinafter, these vehicle heights will be referred to as "the wheel area vehicle height", respectively) on the basis of each of the present wheel area vehicle heights and the manipulation state of the user switch 34. Hereinafter, the target value of the vehicle height of each of the vehicle body parts at the wheels will be referred to as "the target wheel area vehicle height", respectively. For example, when all of the present wheel area vehicle heights are vehicle heights corresponding to "low", respectively and the manipulation state of the user switch 34 requests to raise the vehicle height, the vehicle heights corresponding to "neutral (or high)" are set as the target wheel area vehicle heights, respectively.

Next, the SP/CPU proceeds to the step 330 where the SP/CPU judges if any of the actual wheel area vehicle heights is not within a range between a value VHL and a value VHU. The value VHL corresponds to a value obtained by subtracting a predetermined positive value γ from the target wheel area vehicle height VHtgt (VHL=VHtgt−γ). The value VHU corresponds to a value obtained by adding the predetermined positive value γ to the target wheel area vehicle height VHtgt (VHU=VHtgt+γ). In other words, at the step 330, the SP/CPU judges if any of the suspension devices 41 to 44 does not complete the adjustment of the corresponding wheel area vehicle height.

When any of the suspension devices 41 to 44 does not complete the adjustment of the corresponding wheel area vehicle height at the process of the step 330 being executed, the SP/CPU judges "Yes" at the step 330 and then, executes the processes of the steps 335 and 340 as described below in sequence. Then, the SP/CPU proceeds to the step 395 where the SP/CPU terminates the routine.

Step 335: The SP/CPU controls the compressor driving motor 45a. At this time, when it is necessary to raise any of the wheel area vehicle heights by any of the suspension devices 41 to 44, the SP/CPU drives the compressor driving motor 45a.

On the other hand, when it is necessary to lower any of the wheel area vehicle heights by any of the suspension devices 41 to 44, the SP/CPU stops driving the compressor driving motor 45a.

It should be noted that before the SP/CPU starts driving the motor 45a at the step 335, the SP/CPU starts sending the stop inhibition requesting signal to the EG/ECU 30 through the onboard network CAN. Hereinafter, the timing when the SP/CPU starts driving the motor 45a may be referred to as "the first timing when the condition of driving the motor 45a is satisfied".

Step 340: The SP/CPU changes the position of any of the control valves 46R, 46L, 47R and 47L corresponding to any of the suspension devices 41 to 44 which does not complete the vehicle height adjustment to the communication position. In addition, the SP/CPU changes the position of the exhaust valve 48 to the shut-off position when it is necessary to make any of the suspension devices 41 to 44 raise the corresponding wheel area vehicle height.

On the other hand, the SP/CPU changes the position of the exhaust valve 48 to the communication position when it is necessary to make any of the suspension devices 41 to 44 lower the corresponding wheel area vehicle height.

Then, when a predetermined time period elapses, the SP/CPU starts executing the processes from the step 300 again and executes the processes of the step 305 and the steps following the step 305. At the process of the step 310 being executed, the vehicle height adjustment is not completed. Therefore, the SP/CPU judges "No" at the step 310 and then, proceeds directly to the step 330. As a result, the vehicle height adjustment is executed by executing the processes of the steps 330 and 340.

Then, when the actual wheel area vehicle heights with respect to all of the vehicle body parts (the parts of the vehicle body corresponding to the wheels) correspond to a value adjacent to the target vehicle height VHtgt (that is, correspond to a value between the values VHL and VHU) for each of the wheel area vehicle heights, the SP/CPU judges "No" at the step 330 and then, executes the processes of the step 345 and 350 described below in sequence. Then, the SP/CPU proceeds to the step 395 where the SP/CPU terminates the routine.

Step 345: The SP/CPU stops driving the compressor driving motor 45a if the motor 45a is being driven.

Step 350: The SP/CPU changes the position of any of the control valves 46R, 46L, 47R and 47L, which has been controlled to communication position, to the shut-off position. Further, the SP/CPU changes the position of the exhaust valve 48 to the shut-off position if the position of the exhaust valve 48 has been positioned at the communication position.

Thereby, the vehicle height adjustment based on the manipulation of the user switch 34 is completed.

In some cases, the vehicle body may be inclined by the driver and/or the passenger getting in or out of the vehicle 10 when the vehicle 10 has been stopped or by the air leakage from any of the chambers 41a to 44a. Accordingly, the SP/ECU 50 executes an automatic leveling control for correcting the inclination of the vehicle body.

That is, when the user switch 34 is not manipulated at the process of the step 315 being executed, the SP/CPU judges "No" at the step 315 and then, proceeds to the step 355 where the SP/CPU judges if a requirement for correcting the inclination of the vehicle body (an automatic leveling requirement) has been generated. The SP/CPU generates the automatic leveling requirement when the SP/CPU judges that the body of the vehicle 10 is inclined on the basis of the output values of the vehicle height sensors 51 to 54, etc.

Now, it is assumed that the vehicle body is inclined and thus, the automatic leveling requirement is generated. In this case, the SP/CPU judges "Yes" at the step 355 and then, proceeds to the step 360 where the SP/CPU judges if the target vehicle height change allowance condition is satisfied. For example, this condition is satisfied when the engine 20 is being operated and the battery voltage VB is higher than or equal to the threshold voltage VBth. It should be noted that the condition judged at the step 360 may be the same as or different from the condition judged at the step 320.

When the target vehicle height change allowance condition is satisfied at the process of the step 360 being executed, the SP/CPU judges "Yes" at the step 360 and then, executes the processes of the steps 325 and 330. Further, the SP/CPU executes the processes of the step 335 and 340 until the vehicle height adjustment based on the automatic leveling control is completed. Then, after the vehicle height adjustment based on the automatic leveling control is completed, the SP/CPU executes the processes of the step 345 and 350. As a result, the vehicle height adjustment is stopped and thus, the vehicle body is maintained generally horizontal.

It should be noted that when the SP/CPU judges "No" at any of the steps 305, 320, 355 and 360, the SP/CPU proceeds directly to the step 395 where the SP/CPU terminates the routine. Therefore, in this case, the vehicle height adjustment is not carried out and thus, the motor 45a is not driven.

(2) Sending Stop Inhibition Request Signal and Limiting Motor Drive

Figure 4:
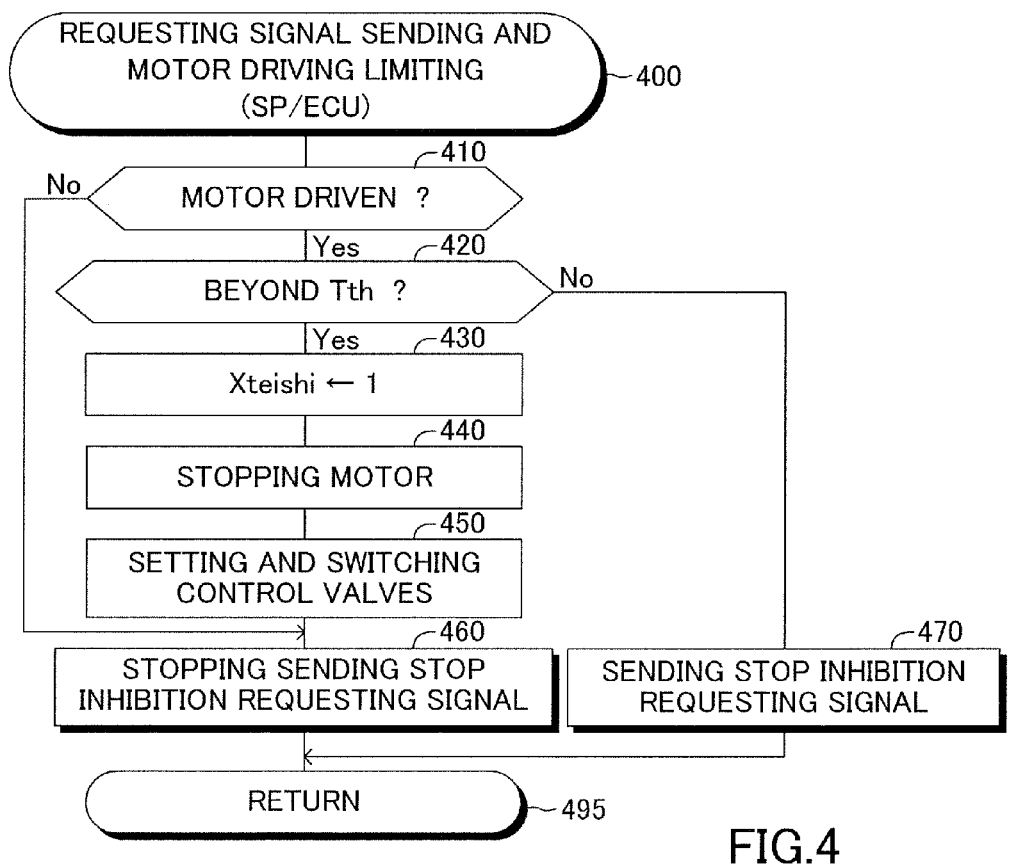
FIG. 4 is a flow chart showing a stop inhibition requesting signal sending and motor driving limiting routine executed by the CPU of the suspension control device shown in FIG. 1.

Further, the SP/CPU is programmed to execute a stop inhibition requesting signal sending/motor driving limiting routine shown in FIG. 4 by a flow chart every a predetermined time period elapses. Therefore, the SP/CPU starts the processes from the step 400 of FIG. 4 at a predetermined timing and then, proceeds to the step 410 where the SP/CPU judges if the compressor driving motor 45a is being driven.

When the motor 45 is not driven at the process of the step 410 being executed, the SP/CPU judges "No" at the step 410 and then, proceeds directly to the step 460 where the SP/CPU stops sending the stop inhibition request signal to the EG/ECU 30. It should be noted that when the SP/ECU 50 does not send the stop inhibition requesting signal to the EG/ECU 30 at the process of the step 410 being executed, the process of the step 460 is executed for confirming that the SP/ECU 50 does not send the stop inhibition requesting signal to the EG/ECU 30.

On the other hand, when the motor 45a is being driven at the process of the step 410 being executed, the SP/CPU judges "Yes" at the step 410 and then, proceeds to the step 420 where the SP/CPU judges if the motor 45a has been continued to be driven beyond the threshold driving time period Tth.

If the vehicle height adjustment is normally carried out, the vehicle height adjustment is completed at a timing before the motor 45a has been continued to be driven beyond the threshold driving time period Tth. Hereinafter, for convenience, the timing when the time period of driving the motor 45a reaches the threshold driving time period Tth may be referred to as "the second timing when the time period of driving the motor 45a reaches a predetermined constant time period Tth. Therefore, normally, the motor 45a has not been continued to be driven beyond the threshold driving time period Tth. Thereby, normally, the SP/CPU judges "No" at the step 420 and then, proceeds to the step 470 where the SP/CPU sends the stop inhibition requesting signal to the EG/ECU 30 through the onboard network CAN. Then, the SP/CPU proceeds to the step 495 where the SP/CPU terminates the routine.

As described above, if the vehicle height adjustment is normally carried out, the motor 45a has not been continued to be driven beyond the threshold driving time period Tth. Therefore, when the motor 45a has been continued to be driven beyond the threshold driving time period Tth, it can be deemed that a malfunction occurs during the vehicle height adjustment. Accordingly, when the motor 45a has been continued to be driven beyond the threshold driving time period Tth (that is, the second timing described above has come) at the process of the step 420 being executed, the SP/CPU judges "Yes" at the step 420 and then, executes the processes of the step 430 to 460 described below in sequence. Then, the SP/CPU proceeds to the step 495 where the SP/CPU terminates the routine.

Step 430: The SP/CPU sets "1" to the value of the vehicle height adjustment stop flag Xteishi. As a result, until the state of the ignition switch 32 is changed to the OFF state and then, to the ON state, no vehicle height adjustment is carried out (refer to the step 305 of FIG. 3).

Step 440: The SP/CPU stops driving the compressor driving motor 45a.

Step 450: The SP/CPU changes the position of any of the control valves 46R, 46L, 47R and 47L, which has been controlled to the communication position, to the shut-off position. Further, if the position of the exhaust valve 48 has been controlled to the communication position, the SP/CPU changes the position of the exhaust valve 48 to the shut-off position.

Step 460: The SP/CPU stops sending the stop inhibition requesting signal to the EG/ECU 30.

2. Actuation of EG/ECU (1) Resetting of Mask (Mask Flag)

Figure 5:
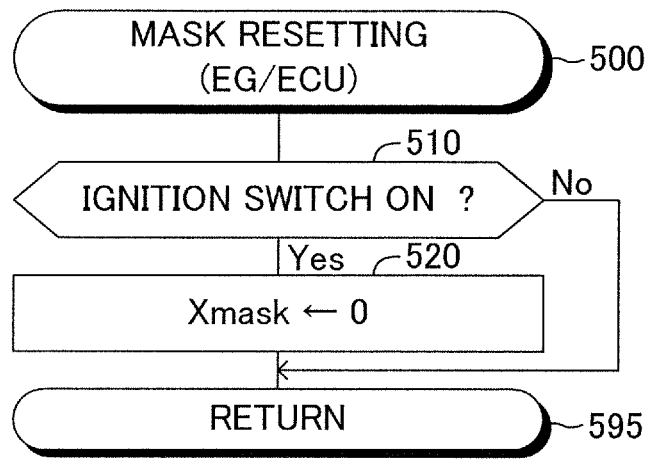
FIG. 5 is a flow chart showing a mask resetting routine executed by a CPU of the engine control device shown in FIG. 1.

The CPU of the EG/ECU 30 (the EG/CPU) is programmed to execute a mask resetting routine shown in FIG. 5 by a flow chart every a predetermined time period elapses. Therefore, the EG/CPU starts the processes from the step 500 of FIG. 5 at a predetermined timing and then, proceeds to the step 510 where the EG/CPU judges if the present time is immediately after the state of the ignition switch 32 is changed from the OFF state (the OFF position) to the ON state (the ON position).

When the present time is immediately after the ignition switch 32 is changed to the ON state, the EG/CPU judges "Yes" at the step 510 and then, proceeds to the step 520 where the EG/CPU sets "0" to the value of a mask flag Xmask (resets the mask flag Xmask). Then, the EG/CPU proceeds to the step 595 where the EG/CPU terminates the routine.

On the other hand, when the present time is not immediately after the ignition switch 32 is changed to the ON state at the process of the step 510 being executed, the EG/CPU judges "No" at the step 510 and then, proceeds directly to the step 595 where the EG/CPU terminates the routine. As described above, the mask flag Xmask is reset immediately after the state of the ignition switch 32 is changed from the OFF state to the ON state.

(2) Setting of Mask (Mask Flag)

Figure 6:
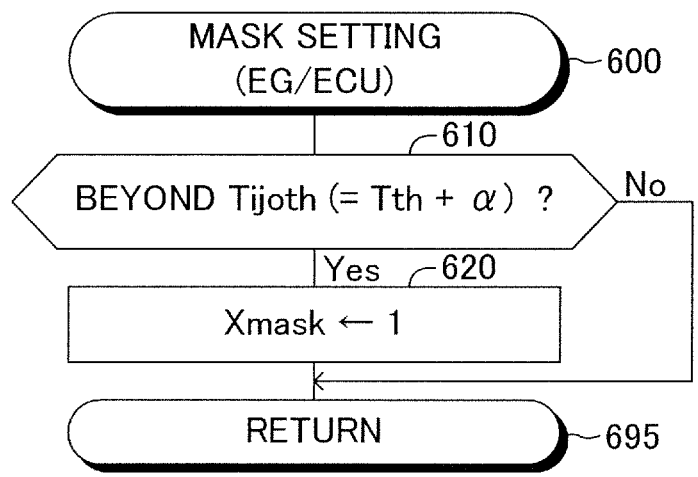
FIG. 6 is a flow chart showing a mask setting routine executed by the CPU of the engine control device shown in FIG. 1.

The EG/CPU is programmed to execute a mask setting routine shown in FIG. 6 by a flow chart every a predetermined time period elapses. Therefore, the EG/CPU starts the processes from the step 600 of FIG. 6 at a predetermined timing and then, proceeds to the step 610 where the EG/CPU judges if the SP/ECU 50 has continued to send the stop inhibition requesting signal to the EG/ECU 30 beyond the malfunction judgment threshold time period Tijoth (=Tth+ α). That is, the EG/CPU judges if the stop inhibition requesting signal has been continued to be sent to the EG/ECU 30 for the malfunction judgment threshold time period Tijoth.

As described above, if the SP/ECU 50 is under the normal state, the driving of the motor 45a is stopped when the motor 45a has been continued to be driven for the threshold driving time period Tth. Thus, the stop inhibition requesting signal has not been continued to be sent beyond the threshold driving time period Tth (refer to the steps 420 and 470 of FIG. 4). Therefore, when the SP/ECU 50 has continued to send the stop inhibition requesting signal to the EG/ECU 30 beyond the malfunction judgment threshold time period Tijoth, it can be judged that the malfunction occurs in the SP/ECU 50. One of the reason of generating such a malfunction is the thermal runaway of the SP/CPU.

Accordingly, when the SP/ECU 50 has continued to send the stop inhibition requesting signal to the EG/ECU 30 beyond the malfunction judgment threshold time period Tijoth, the EG/CPU judges that the malfunction occurs in the SP/ECU 50 (that is, the EG/CPU judges "Yes" at the step 610) and then, proceeds to the step 620. At the step 620, the EG/CPU sets "1" to the value of the mask flag Xmask (that is, the EG/CPU sets the mask flag Xmask) and then, proceeds to the step 695 where the EG/CPU terminates the routine.

On the other hand, when the SP/ECU 50 has not continued to send the stop inhibition requesting signal to the EG/ECU 30 beyond the malfunction judgment threshold time period Tijoth at the process of the step 610 being executed, the EG/CPU judges "No" at the step 610 and then, proceeds directly to the step 695 where the EG/CPU terminates the routine.

(3) Automatic Stop of Engine Operation

Figure 7:
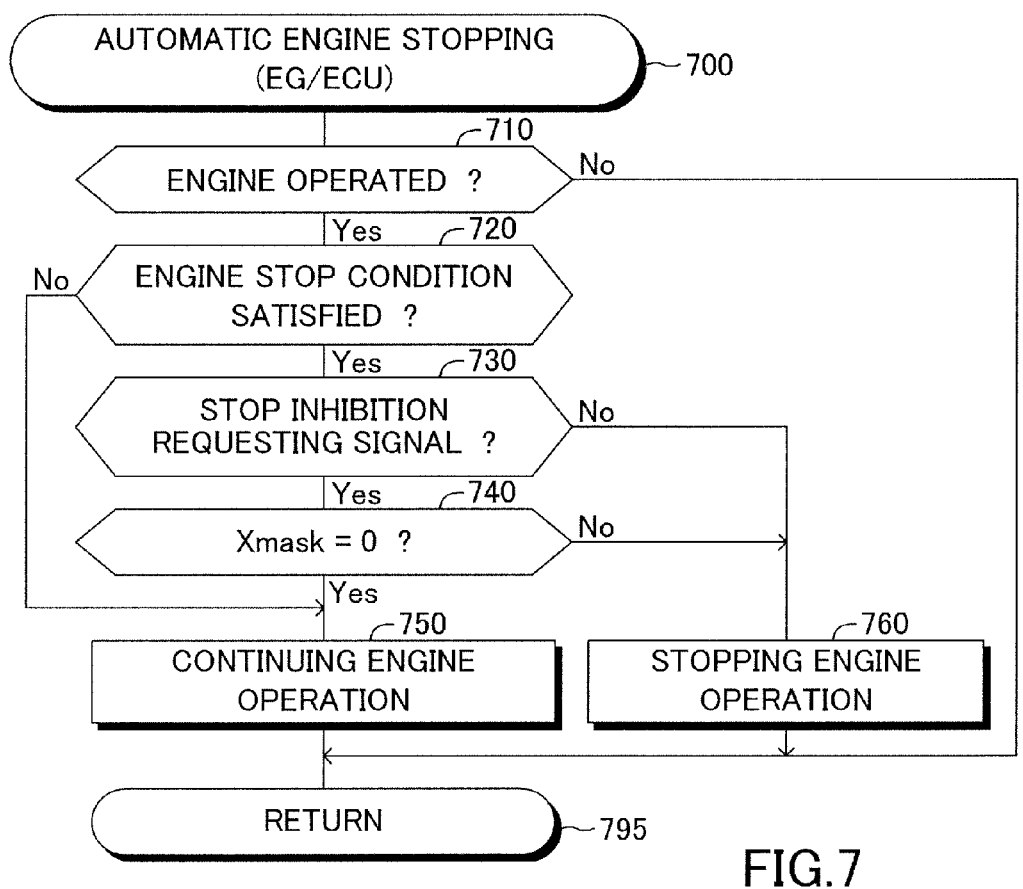
FIG. 7 is a flow chart showing an automatic engine operation stopping routine executed by the CPU of the engine control device shown in FIG. 1.

The EG/CPU is programmed to execute an automatic engine operation stopping routine shown in FIG. 7 by a flow chart every a predetermined time period elapses. Therefore, the EG/CPU starts the processes from the step 700 of FIG. 7 at a predetermined timing and then, proceeds to the step 710 where the EG/CPU judges if the engine 20 is being operated. When the operation of the engine 20 is stopped, the EG/CPU judges "No" at the step 710 and then, proceeds directly to the step 795 where the EG/CPU terminates the routine.

On the other hand, when the engine 20 is being operated at the process of the step 710 being executed, the EG/CPU judges "Yes" at the step 710 and then, proceeds to the step 720 where the EG/CPU judges if the engine operation stop condition described above is satisfied (refer to the conditions 1 to 3 described above).

When the engine operation stop condition is not satisfied, the EG/CPU judges "No" at the step 720 and then, proceeds directly to the step 750 where the EG/CPU continues to operate the engine 20. Then, the EG/CPU proceeds to the step 795 where the EG/CPU terminates the routine.

On the other hand, when the engine operation stop condition is satisfied at the process of the step 720 being executed, the EG/CPU judges "Yes" at the step 720 and then, proceeds to the step 730 where the EG/CPU judges if the SP/ECU 50 sends the stop inhibition requesting signal to the EG/ECU 30.

When the SP/ECU 50 does not send the stop inhibition requesting signal to the EG/ECU 30, the EG/CPU judges "No" at the step 730 and then, proceeds to the step 760 where the EG/CPU stops the operation of the engine 20 by stopping the fuel injection and the fuel ignition. Then, the EG/CPU proceeds to the step 795 where the EG/CPU terminates the routine.

On the other hand, when the SP/ECU 50 sends the stop inhibition requesting signal to the EG/ECU 30 at the process of the step 730 being executed, the EG/CPU judges "Yes" at the step 730 and then, proceeds to the step 740 where the EG/CPU judges if the value of the mask flag Xmask is "0". That is, the EG/CPU judges if it is judged that the malfunction occurs in the SP/ECU 50 on the basis of the value of the mask flag Xmask.

When the value of the mask flag Xmask is "0", that is, when the EG/CPU does not judge that the malfunction occurs in the SP/ECU 50, the EG/CPU judges "Yes" at the step 740 and then, proceeds to the step 750. At the step 750, the EG/CPU continues to operate the engine 20 without automatically stopping the operation of the engine 20 and then, proceeds to the step 795 where the EG/CPU terminates the routine. That is, when the value of the mask flag Xmask is "0", the stop inhibition requesting signal sent to the EG/ECU 30 is deemed to be a normal signal and as a result, the automatic stop of the operation of the engine 20 is inhibited according to the stop inhibition requesting signal.

On the other hand, when the value of the mask flag Xmask is "1" at the process of the step 740 being executed, that is, when the EG/CPU judges that the malfunction occurs in the SP/ECU 50, the EG/CPU judges "No" at the step 740 and then, proceeds to the step 760. At the step 760, the EG/CPU stops the operation of the engine 20 and then, proceeds to the step 795 where the EG/CPU terminates the routine.

As described above, even when the engine operation stop inhibition requesting signal is sent to the EG/ECU 30, if the engine operation stop condition is satisfied and the value of the mask flag Xmask is "1", the EG/CPU ignores (masks) the stop inhibition requesting signal and automatically stops the operation of the engine 20.

(4) Start of Engine Operation

Figure 8:
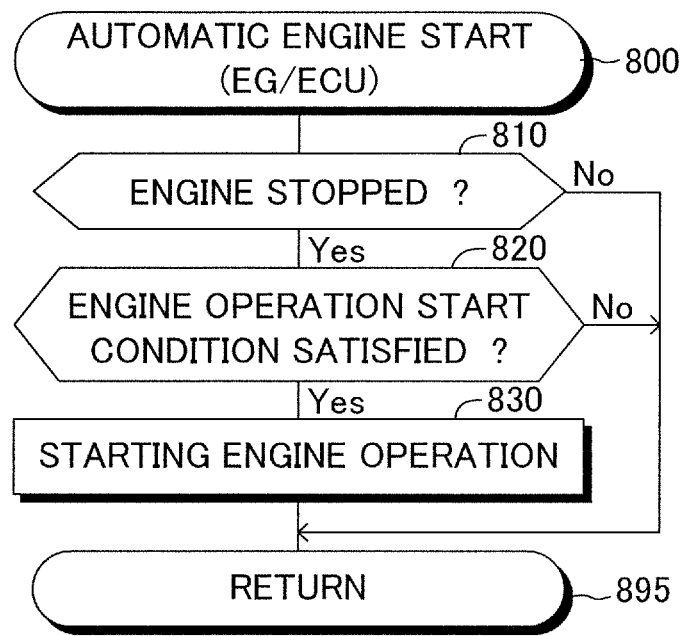
FIG. 8 is a flow chart showing an automatic engine operation start routine executed by the CPU of the engine control device shown in FIG. 1.

The EG/CPU is programmed to execute an engine operation starting routine shown in FIG. 8 by a flow chart every a predetermined time period elapses. Therefore, the EG/CPU starts the processes from the step 800 of FIG. 8 at a predetermined timing and then, proceeds to the step 810 where the EG/CPU judges if the operation of the engine 20 is being stopped (the operation of the engine 20 was automatically stopped by the process of the step 760). When the operation of the engine 20 is not stopped, the EG/CPU judges "No" at the step 810 and then, proceeds directly to the step 895 where the EG/CPU terminates the routine.

On the other hand, when the operation of the engine 20 is being stopped, the EG/CPU judges "Yes" at the step 810 and then, proceeds to the step 820 where the EG/CPU judges if an engine operation start condition is satisfied. For example, the engine operation start condition is satisfied when all conditions described below are satisfied. Of course, the other conditions may be employed as the engine operation start condition.

(Condition 4) The brake switch is under the OFF state. That is, the brake pedal is not depressed.

(Condition 5) The acceleration pedal manipulation amount AP is larger than zero. That is, the acceleration pedal is depressed and thus, the acceleration request is generated.

When the engine operation start condition is not satisfied at the process of the step 820 being executed, the EG/CPU judges "No" at the step 820 and then, proceeds directly to the step 895 where the EG/CPU terminates the routine.

On the other hand, when the engine operation start condition is satisfied, the EG/CPU judges "Yes" at the step 820 and then, proceeds to the step 830 where the EG/CPU starts the operation of the engine 20. Then, the EG/CPU proceeds to the step 895 where the EG/CPU terminates the routine.

As described above, the engine control device 30 according to the embodiment described above is installed on the vehicle 10 equipped with the suspension control device 50 for driving the electric actuator (the motor 45a) for changing the suspension property (in the embodiment described above, the vehicle height) of the vehicle 10.

The engine control device 30 has an engine control part (the EG/CPU). The engine control part is programmed to automatically stop the operation of the engine 20 when the predetermined engine operation stop condition is satisfied (refer to the steps 220 and 260 of FIG. 2 and the steps 720 and 760 of FIG. 7). Further, the engine control part is programmed to automatically start the operation of the engine 20 when the predetermined engine operation start condition is satisfied (refer to the steps 820 and 830 of FIG. 8).

If the suspension control device 50 sends the stop inhibition requesting signal for inhibiting the automatic stop of the operation of the engine 20 in order to drive the actuators to the engine control device 30, the engine control part is programmed to continue to operate the engine 20 even when the engine operation stop condition is satisfied (refer to the steps 220, 230 and 250 of FIG. 2 and the steps 720, 730 and 750 of FIG. 7).

Further, the engine control part is programmed to:

judge if a malfunction occurs in the suspension control device 50 (refer to the step 240 of FIG. 2, the steps 610 and 620 of FIG. 6 and the step 740 of FIG. 7); and ignore the stop inhibition requesting signal and stop the operation of the engine 20 when the engine control part judges that the malfunction occurs in the suspension control device 50 (refer to the judgment "Yes" at the step 240 of FIG. 2 and the judgment "No" at the step 740 of FIG. 7), even if the engine operation stop condition is satisfied and the stop inhibition requesting signal is sent to the engine control device 30 (refer to the steps 220, 230, 240 and 260 of FIG. 2 and the steps 720, 730, 740 and 760 of FIG. 7).

Therefore, even when the stop inhibition requesting signal is continued to be sent to the engine control device 30 due the malfunction of the suspension control device 50, the operation of the engine 20 can be stopped when the engine operation stop condition is satisfied. As a result, the increasing of the consumption of the fuel can be prevented.

Further, the engine control part is programmed to judge if a malfunction occurs in the suspension control device 50 by using the stop inhibition requesting signal (refer to FIG. 6).

Furthermore, the suspension control device 50 is configured to:

drive the actuator (the motor 45a) during a particular time period (during a time period between the timing when the driving of the motor 45a for the vehicle height adjustment starts and the second timing when the threshold driving time period Tth elapses); and send the stop inhibition requesting signal to the engine control device 30 while the suspension control device 50 drives the actuator (the motor 45a) (refer to the step 335 of FIG. 3 and the step 470 of FIG. 4).

Furthermore, the engine control part is programmed to judge that the malfunction occurs in the suspension control device 50 when the stop inhibition requesting signal is sent to the engine control device 30 during a time period other than the particular time period (refer to the step 240 of FIG. 2 and FIG. 6).

In particular, the suspension control device 50 is configured to:

start driving the motor 45a at the first timing when the condition of driving the motor 45a is satisfied and stop driving the motor 45a at the second timing when the time period of driving the motor 45a reaches the predetermined constant time period (the threshold driving time period Tth) or at the timing before the second timing (refer to the judgement "No" at the step 410 and the step 460 of FIG. 4 and the judgments "Yes" at steps 410 and 420 of FIG. 4 and the steps 430 to 460 of FIG. 4); and send the stop inhibition requesting signal to the engine control device 30 while the suspension control device 30 drives the motor 45a (refer to the step 335 of FIG. 3 and the steps 410, 420 and 470 of FIG. 4).

Further, the engine control part is programmed to judge that the malfunction occurs in the suspension control device 50 when the suspension control device 50 has continued to send the stop inhibition requesting signal to the engine control device 30 for a threshold time period (the malfunction judgment threshold time period Tijoth) beyond the predetermined constant time period (the threshold driving time period Tth) (refer to the step 240 of FIG. 2 and FIG. 6).

Further, the engine control part is programmed to continue to ignore the stop inhibition requesting signal until the state of the ignition switch 32 of the vehicle 10 is changed from the ON state to the OFF state when the engine control part judges that the malfunction occurs in the suspension control device 50 (refer to the fact that "1" is continued to be set to the mask flag Xmask in FIGS. 5 and 6 and the mask flag Xmask is referred at the step 740 in FIG. 7).

Furthermore, the engine control part is programmed to stop ignoring the stop inhibition requesting signal when the state of the ignition switch 32 is changed from the ON state to the OFF state and then, again to the ON state after the engine control part judges that the malfunction occurs in the suspension control device 50 (refer to the fact that the "0" is set to the mask flag Xmask in FIG. 5 and the mask flag Xmask is referred at the step 740 of FIG. 7).

Therefore, the engine control device 30 according to the embodiment described above can avoid that the engine 20 is continued to be operated due to the occurrence of the malfunction in the suspension control device 50 when the condition of stopping the operation of the engine 20 is satisfied. As a result, the engine control device 30 can avoid the increasing of the fuel consumption of the engine 20.

<Modifications>

Next, modifications of the embodiment described above will be described. The modification described below is the same as the embodiment described above except that the EG/CPU is programmed to execute a mask setting routine shown in FIG. 9 in place of the mask setting routine shown in FIG. 6. Therefore, the difference between the modification and the embodiment described above will be mainly described.

Figure 9:
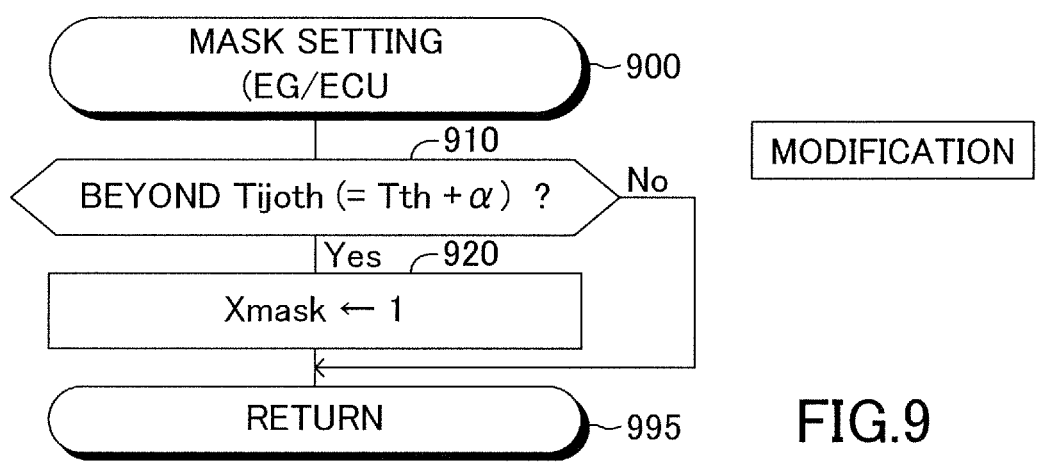
FIG. 9 is a flow chart showing a mask setting routine executed by the CPU of the engine control device according to a modification of the embodiment of the invention.

The EG/CPU is programmed to execute the mask setting routine shown in FIG. 9 by a flow chart every a predetermined time period elapses. Therefore, the EG/CPU starts the processes from the step 900 of FIG. 9 at a predetermined timing and then, proceeds to the step 910 where the EG/CPU judges if a state where the vehicle speed SPD is lower than or equal to the engine operation stop threshold vehicle speed SPDth and the SP/ECU 50 sends the engine operation stop inhibition requesting signal to the EG/ECU 30 (hereinafter, this state will be referred to as "the first state") has continued beyond the malfunction judgment threshold time period Tijoth (=Tth+α).

When the first state has continued beyond the malfunction judgment threshold time period Tijoth, the EG/CPU judges that the malfunction occurs in the SP/ECU 50 (that is, the EG/CPU judges "Yes" at the step 910) and then, proceeds to the step 920. At the step 920, the EG/CPU sets "1" to the value of the mask flag Xmask (that is, the EG/CPU sets the mask flag Xmask) and then, proceeds to the step 995 where the EG/CPU terminates the routine.

On the other hand, when the first state has not continued beyond the malfunction judgment threshold time period Tijoth at the process of the step 910 being executed, the EG/CPU judges "No" at the step 910 and then, proceeds directly to the step 995 where the EG/CPU terminates the routine.

As described above, the modification judges that the malfunction occurs in the SP/ECU 50 when the first state has continued beyond the malfunction judgment threshold time period Tijoth. Therefore, it can be said that this modification judges that the malfunction occurs in the SP/ECU 50 when the SP/ECU 50 has continued to send the stop inhibition requesting signal to the EG/ECU 30 beyond the malfunction judgment threshold time period Tijoth similar to the embodiment described above.

As described above, according to the embodiment and the modification, even when the malfunction (including a malfunction of the communication using the onboard network) occurs in the SP/ECU 50 and the signal for inhibiting the automatic stop of the operation of the engine 20 (the stop inhibition requesting signal) has been continued to be generated, the operation of the engine 20 can be automatically stopped. Thereby, the running of the vehicle 10 with the increased consumption of the fuel of the engine 20, can be avoided.

It should be noted that the invention is not limited to the embodiment described above and various modifications can be employed within the scope of the invention. For example, the EG/ECU 30 according to the embodiment described above judges if a malfunction occurs in the SP/ECU 50 by using the stop inhibition requesting signal. However, it may be judged if a malfunction occurs in the SP/ECU 50 by the other method.

In particular, the SP/ECU 50 may be programmed to send a pulse signal having a particular pattern through the CAN to the EG/ECU 30 every a constant time period elapses. In this case, the EG/ECU 30 may be programmed to judge that the malfunction occurs in the SP/ECU 50 when the pulse signal is not sent to the EG/ECU 30 every the constant time period elapses.

Further, according to the embodiment described above, the actuator, which is driven when the stop inhibition requesting signal is generated, is the motor 45a. However, the actuator is not limited to the motor 45a. For example, when each of the absorber control actuators 41c to 44c needs a large power or a large voltage for ensuring the operation of the actuator, the SP/ECU 50 may be programmed to send the stop inhibition request signal to the EG/ECU 50 when the SP/ECU 50 drives such actuators. However, even in this case, it is preferred that the time period for continuously driving the actuators is limited to a time period shorter than the threshold driving time period Tth.

Further, the SP/ECU 50 may be programmed to always drive the motor 45a from the timing when the motor driving condition is satisfied to the timing when the constant time period TA elapses. In this case, the particular time period corresponds to a time period from the timing when the motor driving condition is satisfied to the timing when the constant time period TA elapses and the SP/ECU 50 continues to send the stop inhibition requesting signal to the EG/ECU 30 during the particular time period TA.

Therefore, in this case, the EG/ECU 30 may be programmed to:

deem the time period from the timing when the EG/ECU starts receiving the stop inhibition requesting signal to the timing when the constant time period TA elapses as the particular time period; and judge that the malfunction occurs in the SP/ECU 50 when the EG/ECU 30 receives the stop inhibition requesting signal during a time period other than the particular time period.

Alternatively, if the EG/ECU 30 and the SP/ECU 40 can identify a certain time period (that is, the particular time period) separately (that is, without the information exchange by the communication) and the SP/ECU 50 is programmed to drive the actuator during the particular time period and send the stop inhibition requesting signal to the EG/ECU 30, the EG/ECU 30 may be programmed to judge that the malfunction occurs in the SP/ECU 50 when the EG/ECU 30 receives the stop inhibition requesting signal during a time period other than the particular time period. Further, the EG/ECU may be connected to the vehicle speed sensor 33 and detect the vehicle speed SPD directly or may be programmed to acquire the vehicle speed SPD from the other ECU not shown (for example, a meter ECU) through the CAN.

What is claimed is:

1. An engine control device applied to a vehicle equipped with:
   an electric actuator for changing a suspension property of said vehicle;
   a suspension control device for driving said actuator; and
   an internal combustion engine,
   the engine control device comprising an engine control part programmed to:
   automatically stop the operation of said engine when a predetermined engine operation stop condition is satisfied; and
   automatically start the operation of said engine when a predetermined engine operation start condition is satisfied,
   wherein said engine control part is programmed to:
   judge if a malfunction occurs in said suspension control device;
   continue the operation of said engine when a stop inhibition requesting signal for inhibiting the automatic stop of the operation of said engine is sent to the engine control device in order to drive said actuator and said engine control part judges that no malfunction occurs in said suspension control device even if said engine operation stop condition is satisfied; and
   ignore said stop inhibition requesting signal and automatically stop the operation of said engine when said engine operation stop condition is satisfied and said engine control part judges that the malfunction occurs in said suspension control device even if said stop inhibition requesting signal is sent to the engine control device.

2. The engine control device of claim 1, wherein said engine control part is programmed to judge if a malfunction occurs in said suspension control device by using said stop inhibition requesting signal.

3. The engine control device of claim 2, wherein said suspension control device is configured to drive said actuator for a particular time period while continuing to send said stop inhibition requesting signal to the engine control device during the driving of said actuator, and
   said engine control part is programmed to judge that the malfunction occurs in said suspension control device when said suspension control device sends said stop inhibition requesting signal to the engine control device during a time period other than said particular time period.

4. The engine control device of claim 2, wherein said actuator includes a motor for driving a compressor for supplying an air to an air suspension for adjusting the height of said vehicle,
   said suspension control device is configured to:
   start driving said motor at a first timing when a condition for driving said motor is satisfied;
   send said stop inhibition requesting signal to the engine control device during the driving said motor; and
   stop driving said motor at a second timing when a time period of driving said motor reaches a predetermined constant time period or at a timing before said second timing, and
   said engine control part is programmed to judge that the malfunction occurs in said suspension control device when said suspension control device continues to send said stop inhibition requesting signal to the engine control device for a malfunction judgment threshold time period longer than or equal to said predetermined constant time period.

5. The engine control device of claim 1, wherein said engine control part is programmed to continue to ignore said stop inhibition requesting signal until a state of an ignition switch of said vehicle is changed from an ON state to an OFF state after said engine control part judges that the malfunction occurs in said suspension control device.

6. The engine control device of claim 5, wherein said engine control part is programmed to stop ignoring said stop inhibition requesting signal when the state of said ignition switch is changed from the ON state to the OFF state and then, to the ON state after said engine control part judges that the malfunction occurs in said suspension control device.

* * * * *